A. UHDE.
FILTER.
APPLICATION FILED OCT. 27, 1910.

989,086.

Patented Apr. 11, 1911.

2 SHEETS—SHEET 1.

WITNESSES
Julius H. Huth
Daniel Holmgren

INVENTOR
Adolph Uhde
BY
Briesen & Knauth
ATTORNEYS

A. UHDE.
FILTER.
APPLICATION FILED OCT. 27, 1910.
989,086.
Patented Apr. 11, 1911.
2 SHEETS—SHEET 2.
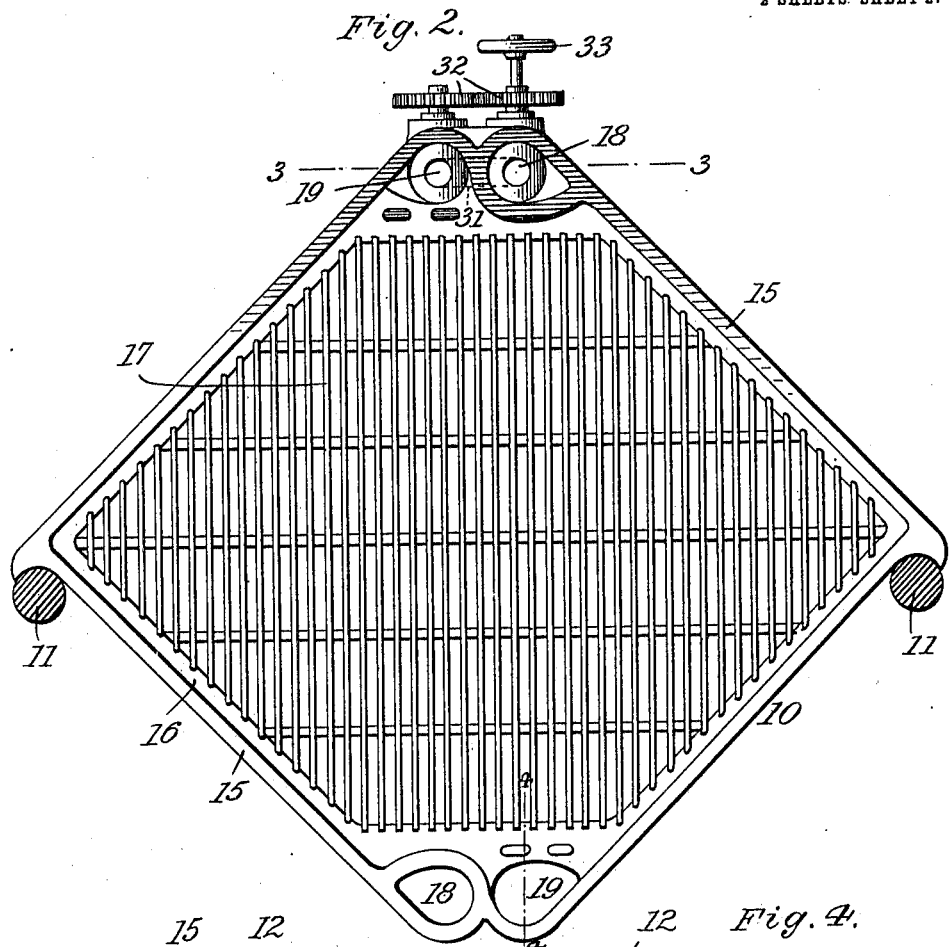
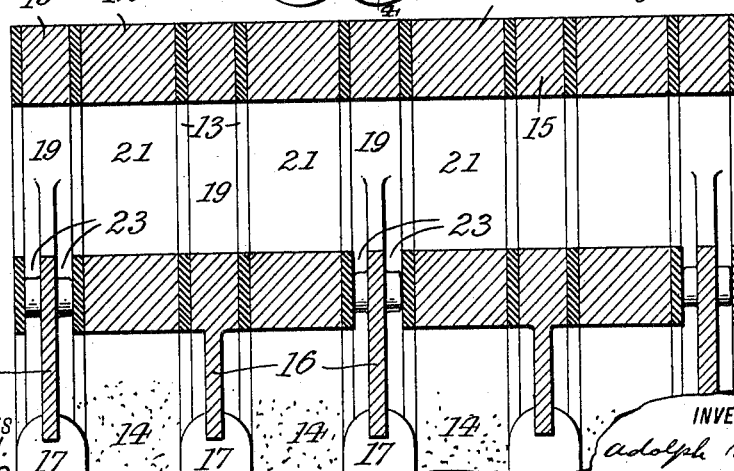

UNITED STATES PATENT OFFICE.

ADOLPH UHDE, OF NEW YORK, N. Y.

FILTER.

989,086.

Specification of Letters Patent.  Patented Apr. 11, 1911.

Application filed October 27, 1910. Serial No. 589,428.

*To all whom it may concern:*

Be it known that I, ADOLPH UHDE, a citizen of Germany, residing at New York city, county and State of New York, have invented certain new and useful Improvements in Filters, of which the following is a specification.

This invention relates to a filter for water, beer and other liquids which is so constructed that the liquid to be filtered may within one and the same apparatus be subjected to either a single or a double filtering operation. In this way the necessity of duplicating the filter whenever the liquid is to be sent twice therethrough is entirely obviated.

Figure 1:
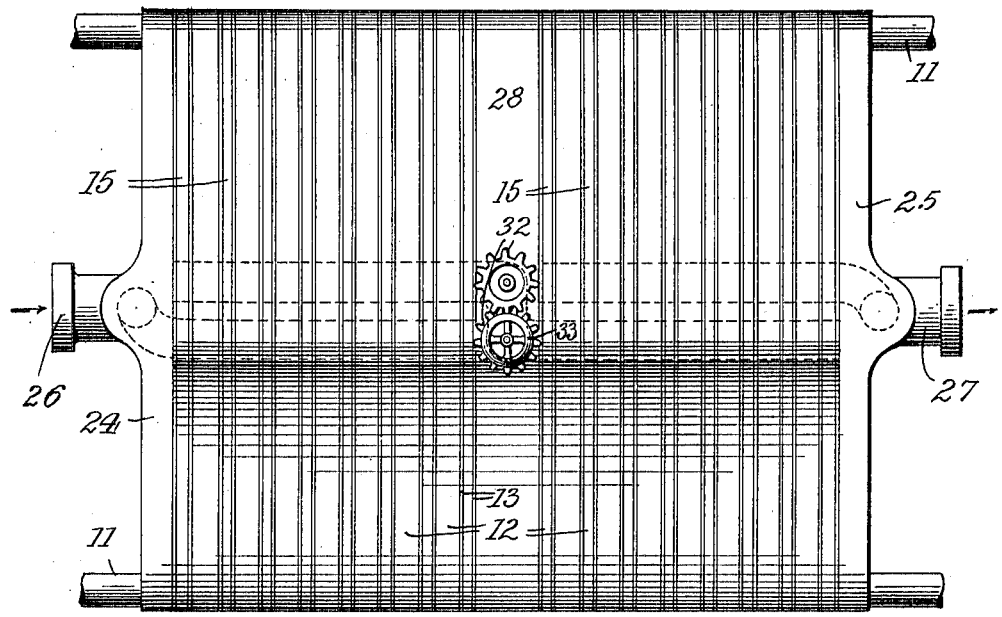
Figure 3:
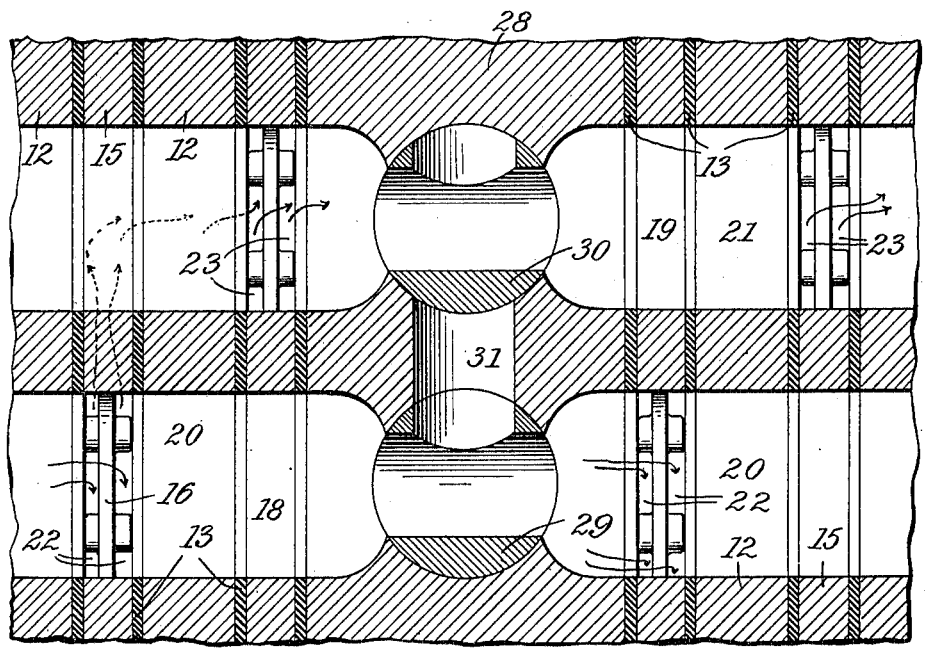

In the accompanying drawings: Figure 1 is a plan of a filter embodying my invention; Fig. 2 a face view of one of the filter grates and adjoining parts; Fig. 3 an enlarged horizontal section on line 3—3, Fig. 2, and Fig. 4 an enlarged vertical section on line 4—4, Fig. 2.

The filter is composed of a plurality of parallel upright grates 10 of like construction suspended from a pair of horizontal rods 11 or otherwise. The grates are spaced from each other by intervening frames 12 packed as at 13 and forming filtering chambers 14 which are charged with a suitable filtering material as indicated in Fig. 4. Each grate 10 has an outer rim 15 which registers substantially with frame 12 and is integral with a circumferential inner web 16 which in turn is integral with the grate bars 17. At the top there is formed in each grate a transverse liquid inlet 18 and a liquid outlet 19, alined with corresponding openings 20, 21 of frames 12. In this way there is formed a continuous inlet channel and a similar parallel outlet channel, extending through the entire length of the filter. The inlet channel 18, 20 communicates with each of the filter chambers 14 along both sides of alternating webs 16 by ducts 22. The intervening grates communicate by similar ducts 23 with the outlet channel 19, 21. The liquid to be filtered is admitted into the inlet channel from which it flows through ducts 22 into chambers 14. Here the liquid which is under pressure is forced through the filtering material and thence out through ducts 23 to be discharged into the outlet channel.

In practice a suitable number of filtering plates are assembled and flanked by heads 24, 25 having inlet and outlet nozzles 26, 27 respectively. The filtering plates are divided into two equal groups by a central partition 28 made of greater thickness than frames 12. Within this partition are fitted a pair of three way cocks 29, 30 connected by a transverse duct 31 formed in partition 28. These cocks may either be set to establish communication respectively between the front and rear portions of the inlet channel and the front and rear portions of the outlet channel or between the front portion of the outlet channel and the rear portion of the inlet channel. In the first case the liquid is subjected to a single filtering operation only and is then carried off through the outlet channel and nozzle 27. In the second case the liquid, after being subjected to a first filtering operation is led from the front section of the outlet channel by cock 30, duct 31 and cock 29 and conveyed to the rear section of the inlet channel so as to be subjected to a second filtering operation before reaching nozzle 27.

It is preferred to so arrange cocks 29, 30 that they will be simultaneously set. For this purpose the stems of the cocks are intergeared as at 32 while one of the stems carries a hand wheel 33.

As described, each filtering chamber has a single upper inlet and outlet, while in practice there are also provided lower inlets and outlets, which are in all respects duplicates of the corresponding upper parts and need therefore not be further referred to.

It will be seen that by the invention described, a single apparatus may effect a single or double filtration, so that the apparatus may be readily set for different materials and for different grades of filtrate.

I claim:

1. A filter comprising two sets of juxtaposed filtering plates and intervening filtering chambers, each set having an inlet channel and an outlet channel passing through all of its plates, and a partition interposed between the plate-sets and having a passage adapted to connect the outlet channel of the first plate-set with the inlet channel of the second plate set.

2. A filter comprising two sets of juxtaposed filtering plates and intervening filtering chambers, each set having an inlet channel and an outlet channel passing through all of its plates, a partition interposed between the plate sets, and a pair of three-way cocks and a transverse duct within the partition for respectively connecting the inlet channel and outlet channel of the first set with the corresponding channels of the second set, or for connecting the outlet channel of the first set with the inlet channel of the second set.

3. A filter comprising two sets of juxtaposed filtering plates and intervening filtering chambers, each set having an inlet channel and an outlet channel passing through all of its plates, a partition interposed between the plate-sets, a pair of three-way cocks and a transverse duct within the partition for respectively connecting the inlet channel and outlet channel of the first set with the corresponding channels of the second set, or for connecting the outlet channel of the first set with the inlet channel of the second set, and means for simultaneously setting said cocks.

ADOLPH UHDE.

Witnesses:
FRANK V. BRIESEN,
KATHERYNE KOCH.